July 22, 1969  M. COLE  3,456,802

DESALINATION BY SUBMERGED REVERSE OSMOSIS

Filed Nov. 22, 1966  2 Sheets-Sheet 1

INVENTOR.
MARC COLE

United States Patent Office 3,456,802
Patented July 22, 1969

3,456,802
DESALINATION BY SUBMERGED REVERSE OSMOSIS
Marc Cole, 100 Hepburn Road, Clifton, N.J. 07012
Filed Nov. 22, 1966, Ser. No. 596,163
Int. Cl. C02b 1/82
U.S. Cl. 210—170                                8 Claims

ABSTRACT OF THE DISCLOSURE

Submerged revise osmosis apparatus having means to supply conditioned water thereto.

---

Figure 1:
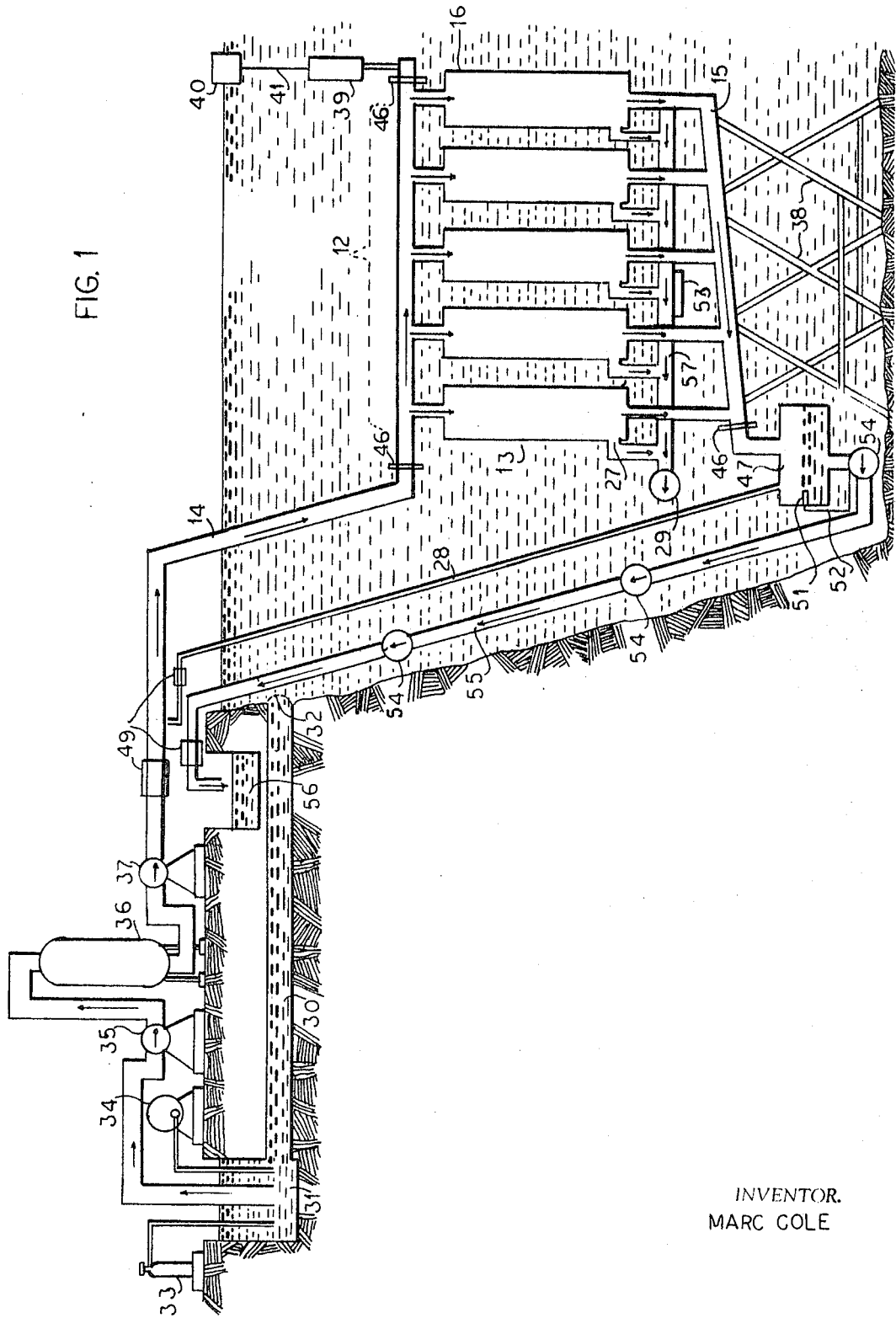

This invention relates in general to improvements in water desalination and more specifically to improvements in desalination by submerged reverse osmosis, submerged reverse osmosis meaning the process whereby desalination takes place at a suitable level under the sea.

There is an urgent need for fresh water in many parts of the world; however in any method of water desalination, cost of the product water is a paramount consideration.

To the present, in reverse osmotic desalination, cellulose acetate membranes have been found to be most efficient since a cellulase acetate membrane will allow the highest rate of water flow-thru with the most complete separation of salt of any membrane tested.

Previously, among others, Chapin and Williams, and Todd have obtained patents for submerged osmotic desalination apparatus. But whereas Chapin and Williams in U.S. Patent 3,156,656 describe an apparatus and method in which they submerge a porous element enveloped by a membrane to a great depth below the ocean surface, their use of this apparatus is for emergency purposes only and thus for a relatively limited period of time. In contradistinction, Todd in U.S. Patent 3,171,808 describes an apparatus and process wherein he submerges a porous element enveloped by a membrane which is intended as a source of desalinated water for an indefinite time. Todd describes the use of cellulose acetate membrane as the membrane of his choice.

The difficulty with Todd's apparatus is that under direct exposure to raw sea water, the membrane would function for only a few days. Indeed, as published by R. E. Kesting in The Journal of Applied Polymer Science, 1959, Volume 2, page 264, "In 0.1 molar sodium chloride under pressure of 600 p.s.i. the selectivity of the cellulose acetate film failed after 6 to 14 days and could not conceivably be used in an economic application of this (reverse osmosis) process." ". . . the failure was shown . . . to be associated with the hydrolysis of the acetyl groups from the polymer chain." The work of Kesting is supported by the work of A. Dobry, Bull. Soc. Chim. (5) 3, 312, 1936, and A. M. Biget, Ann. Chim. (Paris) (12) 5 66, 1950.

Not only is hydrolysis a factor in the short life of cellulose acetate as a membrane exposed to raw ocean water, but a number of other factors, listed below, further decrease the useful life span of a reverse osmotic membrane exposed to raw ocean water.

Among said other factors may be listed the precipitation of calcium salts in the membrane. This is supported by the work of Bray and Menzel in the Office of Saline Water Research and Development Progress Report #176 page 13, part 1, line 6, of April 1966.

Further, a membrane exposed to raw sea water is subject to plugging and coating by bacterial and algeal growth. Still another threat to the life of a reverse osmotic membrane exposed to raw sea water is the presence of organic and inorganic particulate matter in the sea which would coat the membrane and slow water thru-put.

All these factors would so shorten the active life span of a reverse osmotic membrane of whatever material it is composed, as to preclude the economic application of a reverse osmotic membrane exposed to raw ocean water in an apparatus other than one of very limited usage, such as in the emergency apparatus of Chapin and Williams. In an apparatus such as described by Todd, the decrease of water flux thru the membrane would be so rapid and the consequent replacement costs so high as to preclude commercial use of Todd'e apparatus for economic reasons, and indeed we are not aware of any commercial application of Todd's apparatus, and as far as we are aware, none has been successful.

The main object of this invention is to reduce energy requirements of conventional land-based reverse osmotic desalination, and to reduce capital costs involved in compressive energy production for reverse osmotic desalination. In reverse osmotic desalination energy is used for compression to force brine against a semi-permeable membrane. However, as water is forced thru the membrane the concentration of salt in the brine remaining on the high pressure side of the membrane increases, and increasingly greater compressive energy is required to desalinate the resulting increasingly concentrated brine. In common practice, about half the initial brine is desalinated, the balance being discarded. The energy in the discarded brine may be partly recovered. Capital costs to compress and decompress the brine and costs involved in the net energy produced are reflected as an important fraction of the cost of the desalinated water. In submerged reverse osmotic desalination all of these costs are avoided, since the required compressive energy is already present in the brine by virtue of the head of water above the submerged desalination membrane. Up to the present, however, the difficulty with any of the types of apparatus presented for use in submerged reverse osmotic desalination has been that very little or no attempt has been made to protect the desalination membrane from deteriorating performance due to physical and chemical impurities present in raw sea water. The contribution of the present invention lies in the application of the principle, hitherto unused, that sea water can be supplied to a submerged reverse osmotic membrane from the surface of the sea under the same state of compression as that existing at the level under the sea surface at which the membrane is placed, without expenditure of energy other than that required to overcome pipe friction. The advantage of this procedure lies in the ease with which sea water supplied from shore can be conditioned or treated to remove the impurities above mentioned. Furthermore, since the cost of brine conditioning and energy loss by pipe friction of sea water so supplied represents a very small fraction of the cost of the desalinated water, the ratio of desalinated water to discarded brine may now be greatly lowered with a resulting improvement in quality of water desalinated, since usually the salt content of desalinated water decreases with decrease in concentration of salt in the supplied brine. It is further anticipated that piping costs can be kept low provided that means, herein provided, are employed to ensure that the supply pipe is constatnly full of water, in which case, regardless of degree of depth, the differential pressure on the wall of the pipe will be nominal, to the end that extremely thin wall thickness in the supply pipe may be satisfactory.

An object of the present invention is to increase the useful life span of membranes in submerged reverse osmotic desalination.

Under proper conditions cellulose acetate membranes have a useful life span measured in years. This is supported by the work of Bray and Menzel in the report noted above, pages 8, 11, and 20, part 1 and page 18 of part 2, O.S.W. Research and Development Progress Report #176.

Another object of the present invention is to decrease the cost of desalinated water produced by reverse osmosis by decreasing the capital costs of equipment and power costs. In submerged reverse osmosis the working pump pressures may be of the order of 100 p.s.i. whereas in a land based reverse osmosis plant the working pump pressures are usually of the order of 1500 p.s.i. for desalting ocean water.

A further object of the present invention is to decrease the need for maintenance and replacement of membranes and thus to decrease the cost of desalination by reverse osmosis.

Theses and other objects of the present invention will become apparent from the following detailed description of this invention, taken in conjunction with the accompanying drawings illustrating an exemplary embodiment of the invention.

Figure 2:
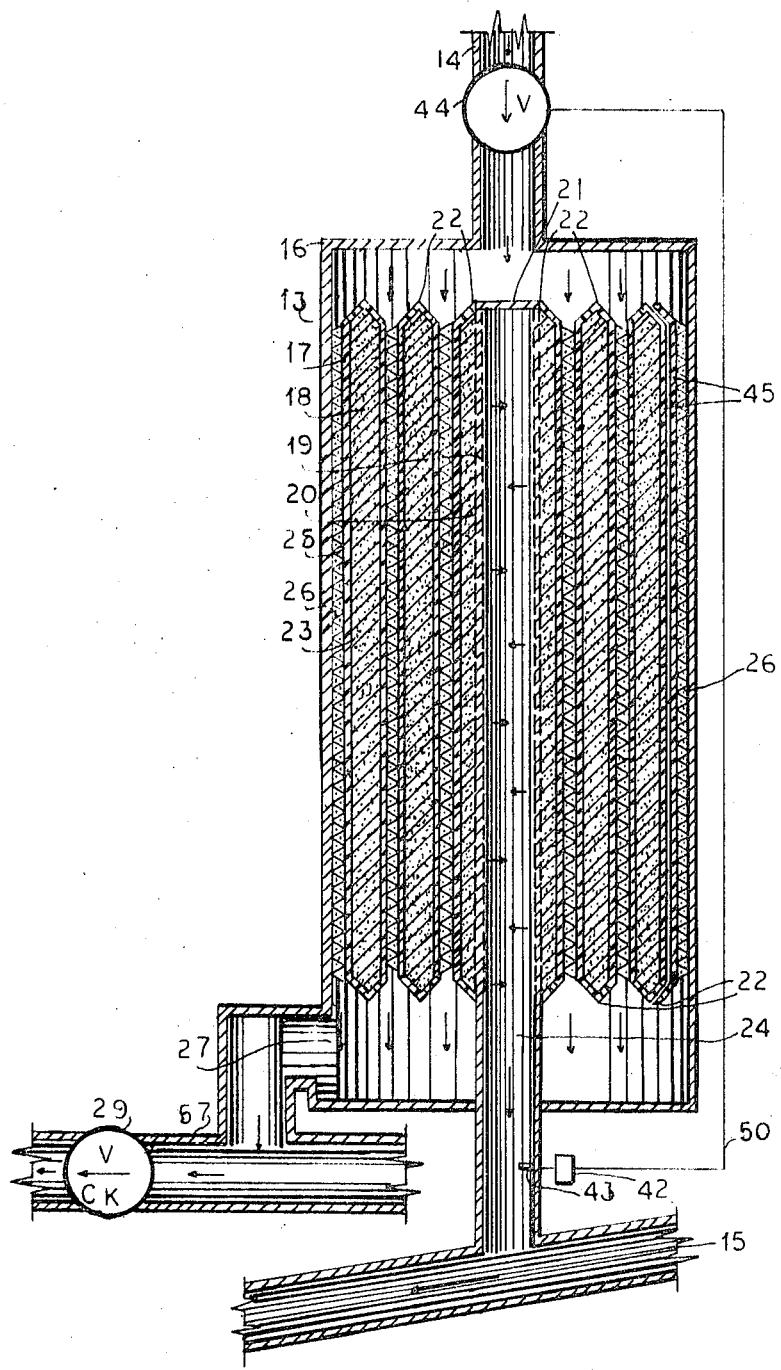

In the drawings:

FIGURE 1 is a diagrammatic view of an exemplary installation for desalting sea water in accordance with the present invention; and FIGURE 2 is a cross sectioned view of one form of a reverse osmosis desalination cell which may be employed in the practice of the present invention.

The specific improvements which comprise the subject of the present invention, and which will accomplish the objects above enumerated are embodied in:

(1) The supplying of only conditioned sea water to the submerged desalination cells; conditioned sea water in this context means raw sea water which has been filtered to remove particulate matter, chlorinated to inhibit organic growth, and adjusted to maintain a pH which will reduce the rate of hydrolysis of the ester comprising the membrane of said desalination cells.

(2) The provision of a positive means of maintaining the interior of said desalination cells at atmospheric pressure by the employment of a separate airline and a drain system for the said desalination cells designed to contain at least some air at all times.

(3) The provision of a means of preventing raw sea water from backing into the said desalination cells.

(4) The provision of a positive means of avoiding salt concentration at the surface of the osmotic membrane of said desalination cells by employing a pump to control the rate of flow of conditioned sea water past said membrane and additionally by regulation of the spacing of said membranes, rather than relying on the vagaries of movements of ocean currents, or slowness of ionic diffusion, of the present art.

Referring to FIGURE 1 illustrating an exemplary embodiment of an installation for desalinating sea water in accordance with the present invention, a desalinator assembly 12 formed of a plurality of desalinator cells 13 is disposed between a conditioned sea water feed pipe 14 and a downward directed drain pipe 15 and is located at a suitable depth in the ocean. This depth is in the range of 3000 feet to about 4000 feet below the surface of the sea. In this specific embodiment, the desalinator cells 13 are enclosed in tubes 16 supported by feed pipe line 14 and drain pipe 15, sets of a plurality of such tube-like structures being arranged in parallel along a length of the pipes 14 and 15.

FIGURE 2 illustrates details of said hollow, tubular vessel 16 of suitably corrosion-resistant metal containing a sheet of membrane 17 which is folded over to form an envelope containing an incompressible sand-type granular material 18, which acts as the product water side surface 23 backing layer to the membrane 17. A product water take-off tube 19 with apertures 20 and sealed at one end 21 is inserted inside the said envelope of membrane 17 at, and with the long axis of tube 19 parallel to, the fold of membrane 17. The open end 24 of tube 19 protrudes from said envelope, which is now cemented to itself at its edges 22 and to the tube 19 where the edges 22 touch the tube 19, and to itself at its ends 45, forming a completely sealed envelope except for one open end 24 of the product water take-off tube 19. On one surface 25 of the envelope of membrane 17 is placed a suitably meshed screen 26 preferably of polyethylene with a thickness of approximately 0.02 inch, and starting at the tube 19 inserted end, the envelope of membrane 17 with its screen 26 is rolled into a tight spiral. The screen 26 is used to suitably space the sea water side surface 25 of membrane 17 during the roll-up and to provide uniform sea water channels of about 0.02 inch. The sand type material 18 is spread on membrane 17 prior to folding and material 18 forms a layer about 0.02 inch deep and before the folding of membrane 17, is cemented to itself and to the membrane 17 by a water soluble glue which dissolves on contact with water when the apparatus is used. The tightly rolled-up spiral of membrane 17 containing the product water side backing sand-type material 18, the now central product water take-off tube 19, and the spacing screen 26 is placed inside tube 16 so that the closed end 21 of the tube 19 is located a short distance below the open end of the feed pipe line 14, to form the osmotic cell 13. The conditioned sea water feed flows into the cell 13 thru the pipe 14, past the spacer screen 26 in a direction parallel to the long axis of the collector tube 19, and leaves the cell 13 as a concentrated brine at the cell outlet 27 thru pipe 57 and past check valve 29 into the sea. The check valve 29 prevents any of the raw sea water from back-flowing into the cell 13.

Referring to FIGURES 1 and 2, the product water flows from the sea water high pressure side 25 of membrane 17, is desalinated as it is forced thru the membrane 17, and flows into the porous backing layer 18. The product water then flows within the sand-type layer 18, parallel to the surface 23 of membrane 17, thru the apertures 20, into the product water take-off tube 19 from where the product water flows via drain pipe 15 into the collector tank 47 and from thence into the pumps 54 and via line 55 into the product water storage tank 56. A pipe line 28 allows atmospheric air free access to the collector tank 47 and via the downward directed drain pipe 15, to establish atmospheric pressure inside product water take-off tube 19. It would be necessary to size the drain pipe 15, the collector tank 47, the pumps 54, and the pipe 55 large enough so the pipe 15 and tank 47 are never more than partly full. A level indicator 53, readable at a buoy 40, would aid in positioning the assembly 12 so that the pipe 15 is disposed in a downward draining position.

Referring again to FIGURE 1, a pipe 30 allows raw sea water to flow thru the screen 32 into tank 31. A chlorinator 33 is used to chlorinate the sea water in tank 31, and an acid, preferably sulfuric acid, from tank 34 is used to regulate the pH of the sea water in tank 31. A pump 35 forces the sea water from tank 31 thru a filter 36, which may be a sand filter, to reduce particle size in the feed water to about 15 to 20 microns, and a pump 37 forces the conditioned and filtered water via pipe 14 into the desalination cells 13. Suitable structural members 38 may be used to support the desalinator assembly 12 at some small height above the sea floor and also to integrate the entire submerged structure so it may, when necessary, be raised to the surface of the sea as a unit. A conventional flotation unit 39 may be used as a convenient means to raise the entire submerged assembly 12, including its appendaged pipes, tank, and motors to sea level for maintenance. The buoy 40 may be attached to float 39 for location purposes by a cable 41, and flexible joints 49 may be fitted into the pipes 14, 55, and 28 to facilitate raising the assembly 12. Flanges 46 may be used in removing the assembly 12.

Referring to FIGURE 2, a conductivity cell 42 with a sensor 43 located in the product water line 15 may be connected electrically by wire 50 to valve 44 to stop the feed of conditioned sea water if the salt content of the product water rises above a prescribed value.

In FIGURE 1, a float or similar mechanism 51 may be employed at a suitable level in tank 47 to actuate pumps 54 so that the level of product water in tank 47 may be held to a desired level to provide an unobstructed pathway for air from the atmosphere thru pipe 28, tank 47 and pipe 15 into the tube 19 at the center of the cells 13. The electrical wire 52 may be used to actuate pumps 54 by float 51. Pumps 35 and 37 may be sized so that for each volume of conditioned water which flows thru membrane 17, approximately one to four volumes of conditioned water will flow thru check valve 29 into the sea.

As regards the conditioning of the raw sea water, it has been found that intermittent chlorination is preferable to a constant stream of chlorine, and that the introduction of 10 p.p.m. of chlorine based on the weight of sea water feed during a period of one half hour at intervals of 8 hours is satisfactory to check growth of bacteria and algae; that a pH of 3 to 7 will inhibit hydrolysis of the cellulose ester membrane with a preferred pH being 4; and that particulate matter of a size smaller than 15 to 20 microns is not required for a reasonable working life of about one year of the osmotic membrane. Finally, it has been found that an acid is needed not only to regulate pH, but to prevent precipitation of calcium salts within the osmotic membrane.

The most economical application of the invention herein described will be realized in those locations where ocean depths of about 4000 feet are located within two or three miles off shore. However, since reverse osmosis plants in general are readily instrumented and automated it is suggested that in those locations where the required sea depth is ten miles or more from the shore a submerged platform be employed that is anchored by cable at a level of about 40 feet below the surface of the sea to escape storm turbulence. This platform would hold all of the water conditioning equipment with the closed ends of flexible supply lines for chlorine and acid anchored by means of, and capable of being raised by, a cable to buoy at the surface. The air line 28, provided with an air-water separator to eliminate spray, might also be anchored to a buoy. Only the product water line 55 would extend from the submerged tank 47 to the shore tank 56. Submerged tank 31 would be totally enclosed and fitted with a water level device. The platform would be raised by float or cable as required for maintenance.

I claim:

1. In a reverse osmotic sea water desalination apparatus, submerged at a suitable depth under the sea, the improvement which provides a means for supplying conditioned sea water to the said desalination apparatus, said means consisting of a closed conduit thru which conditioned sea water is piped to the high pressure side of one or more osmotic membranes in said desalination apparatus, said suitable depth being such that the hydrostatic pressure of the supplied conditioned water against said high pressure side of said membrane or membranes is sufficient to effect at least some desalination of said conditioned sea water thru said membrane or membranes by reverse osmosis, said conditioned sea water being supplied thru said closed conduit from a level substantially close to the surface of the sea.

2. In the apparatus as described in claim 1, the improvement which consists in providing a means for regulating the rate of flow of said supplied conditioned water past the high pressure side of the said osmotic membrane or membranes in the said apparatus.

3. In the apparatus as described in claim 1, the improvement which consists in providing a means for keeping the said closed conduit supplying conditioned sea water to the said high pressure side of said membrane or membranes full of said conditioned sea water at all times while said closed conduit is submerged.

4. In the apparatus as described in claim 1, the improvement which consists of extending the said closed conduit supplying conditioned sea water to the high pressure side of said membrane or membranes to a level located at a convenient point on shore, said level on shore being above sea level.

5. In the apparatus as described in claim 1, the improvement which consists of extending the said closed conduit supplying conditioned sea water to the high pressure side of said membrane or membranes to a level located at a platform suspended above said desalination apparatus, said platform level being approximately 40 feet under the surface of the sea.

6. The apparatus as described in claim 1, and means to filter the sea water supplied to said apparatus to remove particulate matter of a size preferably larger than 15 microns.

7. The apparatus as described in claim 1, and means treating the sea water supplied to said apparatus with an algaecide.

8. The apparatus as described in claim 1, and means adjusting the sea water supplied to said apparatus with respect to pH.

References Cited

UNITED STATES PATENTS

| | | | |
|---|---|---|---|
| 1,825,631 | 9/1931 | Horvath | 210—23 |
| 3,060,119 | 10/1962 | Carpenter | 210—321 X |
| 3,156,645 | 11/1964 | Chapin et al. | 210—321 X |
| 3,171,808 | 2/1965 | Todd | 210—321 |
| 3,296,122 | 1/1967 | Karassik et al. | 210—22 X |
| 3,342,728 | 9/1967 | Malm et al. | 210—22 X |
| 3,355,382 | 11/1967 | Huntington | 210—22 |

OTHER REFERENCES

"Research and Development on Reverse Osmosis Membrane Modules," R&D Progress Report No. 165, for Office of Saline Water, received in Patent Office Feb. 14, 1966, pp. 1–3, 17, 19, 32, 34, 35, 36, 38, 50 and 51 relied on. For sale by Superintendent of Documents, U.S. Gov't Printing Office.

REUBEN FRIEDMAN, Primary Examiner

FRANK A. SPEAR, JR., Assistant Examiner

U.S. Cl. X.R.

210—199, 203, 206, 258, 262, 321